US006977937B1

(12) United States Patent
Weinstein et al.

(10) Patent No.: US 6,977,937 B1
(45) Date of Patent: Dec. 20, 2005

(54) RADIO NETWORK ROUTING APPARATUS

(75) Inventors: Joseph J. Weinstein, Somerville, MA (US); John R. Zavgren, Acton, MA (US); Brig Barnum Elliott, Arlington, MA (US); Norman Rehn, Newbury, MA (US); William S. Passman, Lexington, MA (US)

(73) Assignee: BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 09/546,052

(22) Filed: Apr. 10, 2000

(51) Int. Cl.[7] ............................................. H04L 12/56
(52) U.S. Cl. ...................................... 370/401; 370/252
(58) Field of Search ................................ 370/351, 400, 370/404, 408, 395.31, 395.71, 252, 254, 370/349, 395.5, 401, 469

(56) References Cited

U.S. PATENT DOCUMENTS

| | | | |
|---|---|---|---|
| 4,718,002 A | 1/1988 | Carr ............................ 364/200 |
| 4,827,411 A | 5/1989 | Arrowood et al. | |
| 5,093,824 A | 3/1992 | Coan et al. ..................... 370/16 |
| 5,117,422 A | 5/1992 | Hauptschein et al. .......... 370/93 |
| 5,243,592 A | 9/1993 | Perlman et al. ................ 370/17 |
| 5,412,654 A | 5/1995 | Perkins ....................... 370/94.1 |
| 5,850,592 A | 12/1998 | Ramanathan ................... 455/7 |
| 5,878,095 A | 3/1999 | Kainulainen | |
| 5,881,246 A | 3/1999 | Crawley et al. ........ 395/200.68 |
| 5,913,921 A | 6/1999 | Tosey et al. ................. 709/220 |
| 6,069,895 A * | 5/2000 | Ayandeh ...................... 370/399 |
| 6,088,622 A | 7/2000 | Dollin et al. | |
| 6,092,096 A * | 7/2000 | Lewis .......................... 709/200 |
| 6,275,492 B1 * | 8/2001 | Zhang .......................... 370/392 |
| 6,310,883 B1 * | 10/2001 | Mann et al. ................. 370/408 |
| 6,349,091 B1 * | 2/2002 | Li ................................. 370/238 |
| 6,385,174 B1 * | 5/2002 | Li ................................. 370/252 |
| 6,470,329 B1 | 10/2002 | Livschitz | |
| 6,473,421 B1 * | 10/2002 | Tappan ........................ 370/351 |
| 6,496,510 B1 * | 12/2002 | Tsukakoshi et al. ......... 370/401 |
| 6,542,469 B1 * | 4/2003 | Kelley et al. ................ 370/238 |
| 6,553,240 B1 * | 4/2003 | Dervarics .................... 455/566 |
| 6,594,268 B1 * | 7/2003 | Aukia et al. ................. 370/400 |
| 6,745,224 B1 | 6/2004 | D'Souza et al. | |

* cited by examiner

Primary Examiner—Man U. Phan
Assistant Examiner—Toan Nguyen
(74) Attorney, Agent, or Firm—Fish & Neave IP Group Ropes & Gray LLP

(57) ABSTRACT

In a radio network having plural routers (10, 12, 14, 16, 18), each router includes a routing table (101, 121, 141, 161, 181). Link state information of the network that has been forwarded to the router is received and used to determine the connections in the network. The determined network connections are collected to generate network topology information which is placed in the routing table (101, 121, 141, 161, 181). The network topology information is retrievable for inclusion in messages forwarded by the receiving router.

34 Claims, 7 Drawing Sheets

RADIO NETWORK ROUTING APPARATUS

BACKGROUND OF THE INVENTION

1. Field of the Invention

The present invention relates to a radio network routing apparatus, and more particularly, to a protocol which reduces the amount of protocol traffic in mobile network routing.

2. Description of Related Art

Mobile networks typically use radios to communicate, but such radios are relatively slow data paths, as compared to wired networks or networks connected with fiber-optics.

In computer networks, the Open Shortest Path First (OSPF) routing algorithm is used for synchronizing the communication information in a computer network. The OSPF routing protocol, is a type of link-state protocol. A detailed discussion of link-state routing, including the OSPF protocol is included in Chapter 5 of *Routing in Communications Networks* by Martha Steenstrup and Chapter 5.2.2 of *Computer Networks* by Andrew S. Tanenbaum. OSPF provides a method of synchronizing databases in computer network "routers." In OSPF, the router periodically advertises information describing its own database data (also referred to, herein, as link state data) to a neighboring router and includes a sequence number that the neighboring router can use to detect old or duplicate advertisements. The router increases the sequence number when it originates a new version of the advertisement. Thus, a larger sequence number signifies a more recent advertisement. The OSPF routing algorithm is also described in U.S. Pat. No. 5,913,921 (Tosey et al.) and U.S. Pat. No. 5,881,246 (Crawley et al.).

Mobile networks have been unable to use standard OSPF protocols to exchange internet routes and addresses. This is primarily due to the fact that OSPF protocols require constant route discovery through the use of HELLO messages. HELLO messages are packets of information dispersed by each node throughout the network to determine network topology. This HELLO traffic, alone, can potentially utilize all of the message capability (also referred to, herein, as "bandwidth") of a mobile network having numerous nodes.

For example, a network consisting of four radio nodes (i.e., NODE A, NODE B, NODE C, AND NODE D) would generate several HELLO messages. NODE A would send a HELLO message to each of NODES B, C, and D; NODE B would send a HELLO message to each of NODES A, C, and D; NODE C would send a HELLO message to each of NODES A, B, and D; and NODE D would send a HELLO message to each of NODES A, B, and C. Each such HELLO message sent by a radio node must be answered with a reply HELLO message. Thus, the resulting number of HELLO messages (HM) for a network with N nodes can be determined by the following formula:

$$HM = N \times (N-1) \times 2$$

Accordingly, a network with four nodes would generate 24 HELLO messages. A network of 100 nodes would produce 19,800 HELLO messages. Clearly, the generation of so many HELLO messages in OSPF protocols has made the use of such protocols in mobile networks unfeasible.

SUMMARY OF THE INVENTION

Among the several objects of the present invention, is to reduce the amount of protocol traffic and, thereby, reduce bandwidth usage. Another objective of the present invention is to keep protocol messages as short as possible.

According to a first aspect of the present invention, each router in a radio network having a plurality of routers comprises a memory storing a routing table, and a receiver for receiving link state information from the network. A processor is provided for (i) determining, responsive to the received link state information forwarded to the router, a status of connections in the network, (ii) generating network topology information based on the determined connection status information, (iii) placing the generated network topology information in said routing table, and (iv) transmitting the network topology information in the routing table to at least one other router in the network.

According to a second aspect of the present invention, a method of distributing network topology information in a radio network that includes a plurality of routers comprises the steps of receiving link state information of the network that is forwarded to each router; determining connections of devices in the network in the receiving router responsive to the received link state information forwarded to the router; and collecting the determined device connection information to generate network topology information in the receiving router. The generated network topology information is placed in a routing table of the receiving router, and the network topology information is retrieved from the routing table.

According to a third aspect of the present invention, a routing system in a radio network having plural routers comprises a plurality of routers each including a receiver for receiving link state information from the network in a message issued to the plurality of routers. Each router also includes a processor, responsive to the received link state information, for (i) determining router connection information in the network, (ii) collecting the determined router connection information (iii) generating network topology information from the collected router connection information, (iv) storing the generated network topology information in a routing table, and (v) retrieving the network topology information in the routing table and forming it into a link state message to be broadcast to at least one other router in the network.

According to a fourth aspect of the present invention, a computer executable software code stored on a computer readable medium is used for distributing network topology information in a radio network that includes a plurality of routers. The code comprises code for receiving link state information of the network that is forwarded to each router; code for determining connections of devices in the network in the receiving router responsive to the received link state information forwarded to the router; and code for collecting the determined device connection information to generate network topology information in the receiving router. Code is included for placing the generated network topology information in a routing table of the receiving router, and code is provided for retrieving the network topology information from the routing table.

The foregoing and other objects, advantages, and features of the present invention will become more apparent from the following detailed description of the preferred embodiments taken in conjunction with the accompanying drawings.

DETAILED DESCRIPTION OF THE PREFERRED EMBODIMENTS

The present invention relates in substantial part to a radio open shortest path first (ROSPF) protocol in mobile networking routing. In particular, this protocol (which can be used in Intranet routing) involves dramatically reducing the amount of protocol traffic and shortening the length of each protocol message. The reduction in protocol traffic facilitates the use of ROSPF protocols in mobile networks.

Typically, HELLO messaging is the only way that the radio learns about other nodes in the system. However, the current invention does not require such extensive messaging. Rather, the ROSPF protocol utilizes the current forwarding table of a radio node to learn about the other nodes in the system. The mobile routing protocol initiates link state flooding every second or so in a controlled manner to determine the connectivity topology of the network. Flooding is known to those of ordinary skill in the art, for example, as described in Steenstrup's *Routing in Communications Networks*. The flooding procedure is used for distributing link-state advertisements (LSA) (also referred to, herein, as link-state packets, LSP) throughout the routing domain. When the connectivity of the network changes, a new LSA describing the change must be created and flooded to all of the other nodes. There is no need for reply messaging.

The preferred embodiments will be described with respect to a wireless mobile communications station and to a network formed by a plurality of similar mobile stations. However, the present invention is not limited to the wireless mobile communications field. Instead, the invention is applicable to many other types of networks, including cellular telephone systems, wireless metropolitan area networks, and so forth.

Figure 1:
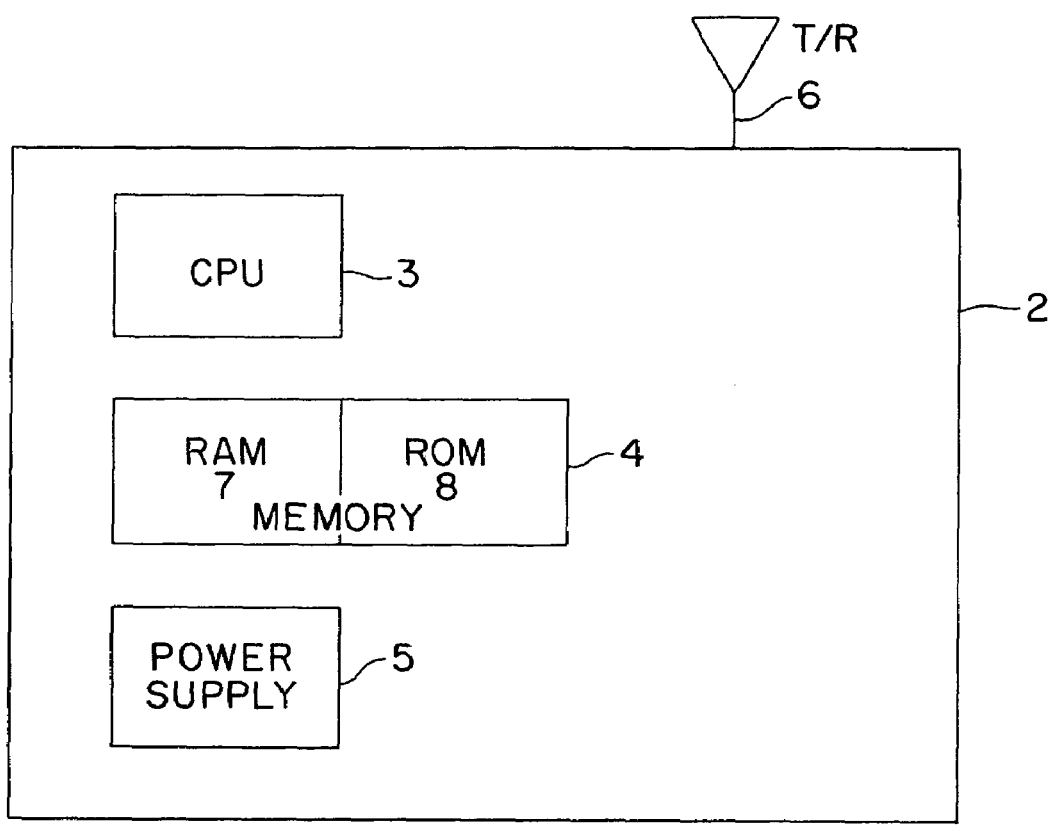
FIG. 1 is a block diagram of a mobile communications station.

FIG. 1 depicts a wireless communications station 2. The mobile station 2 includes a central processing unit (CPU) 3, a memory 4 (suitable for storing computer executable software therein), a power supply 5, a transceiver 6 (e.g., a transmitter and a receiver), RAM 7, and ROM 8. Alternatively, the mobile station 2 may include more than one transmitter and/or more than one receiver. The mobile station 2 can also include an Ethernet interface, as well as other interfacing ports. With these arrangements, the mobile station 2 is able to simultaneously communicate with more than one station. Communication with multiple stations can occur, for example, through different channels (or "communication links"), and/or by transmitting specific identifying information (or "coded information") for each intended source or target.

Figure 2:
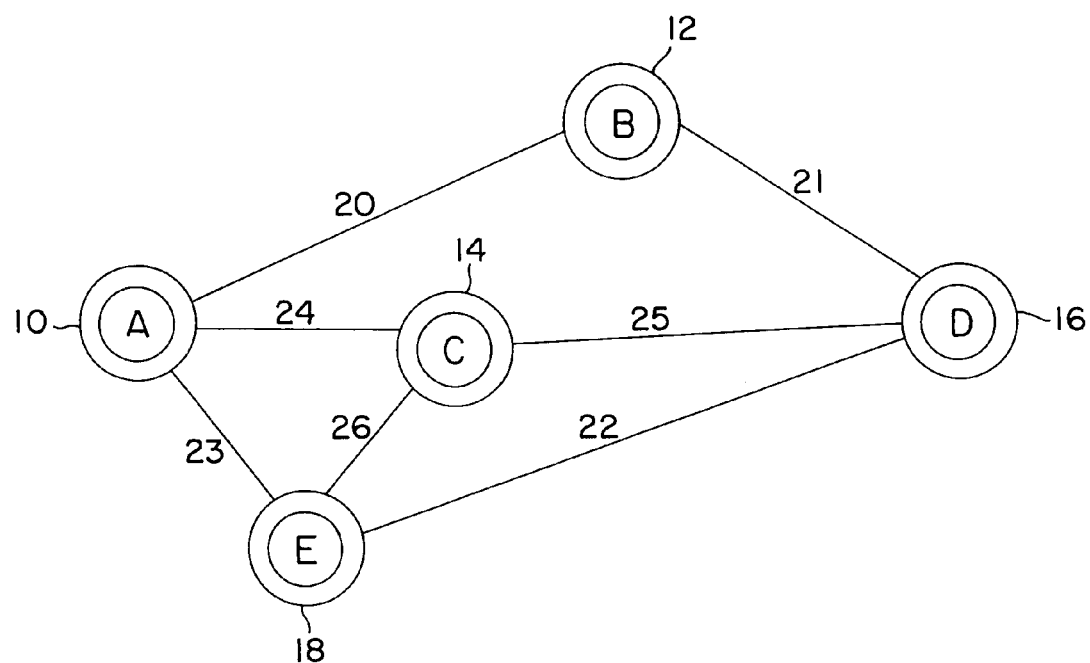
FIG. 2 is a diagram illustrating a radio network configuration in accordance with the present invention.

FIG. 2 is a schematic diagram of radio nodes in a wireless network according to the present invention. Five routers 10, 12, 14, 16, and 18 comprise the wireless network. Established channels or data communication links connecting the various routers are designated by reference characters 20–26. The reference characters 20–26 also represent the cost of communicating along each respective channel (i.e., the cost of sending data traffic over each link). For example, the cost of sending data traffic from node A to node B is 20.

While FIG. 2 illustrates a particular interconnection of the various stations shown, it should be understood that this configuration of connections is not pre-determined and that other patterns of connections might easily arise in accordance with the present invention. Moreover, the pattern of connections can change during operation, both to accommodate the introduction of new stations and to allow for the withdrawal or movement of one of the nodes. The mode of operation of each router is controlled by an embedded microprocessor (e.g. the CPU) and the method of operation described herein is intended to be implemented automatically by the programming of the microprocessors.

Figure 3:
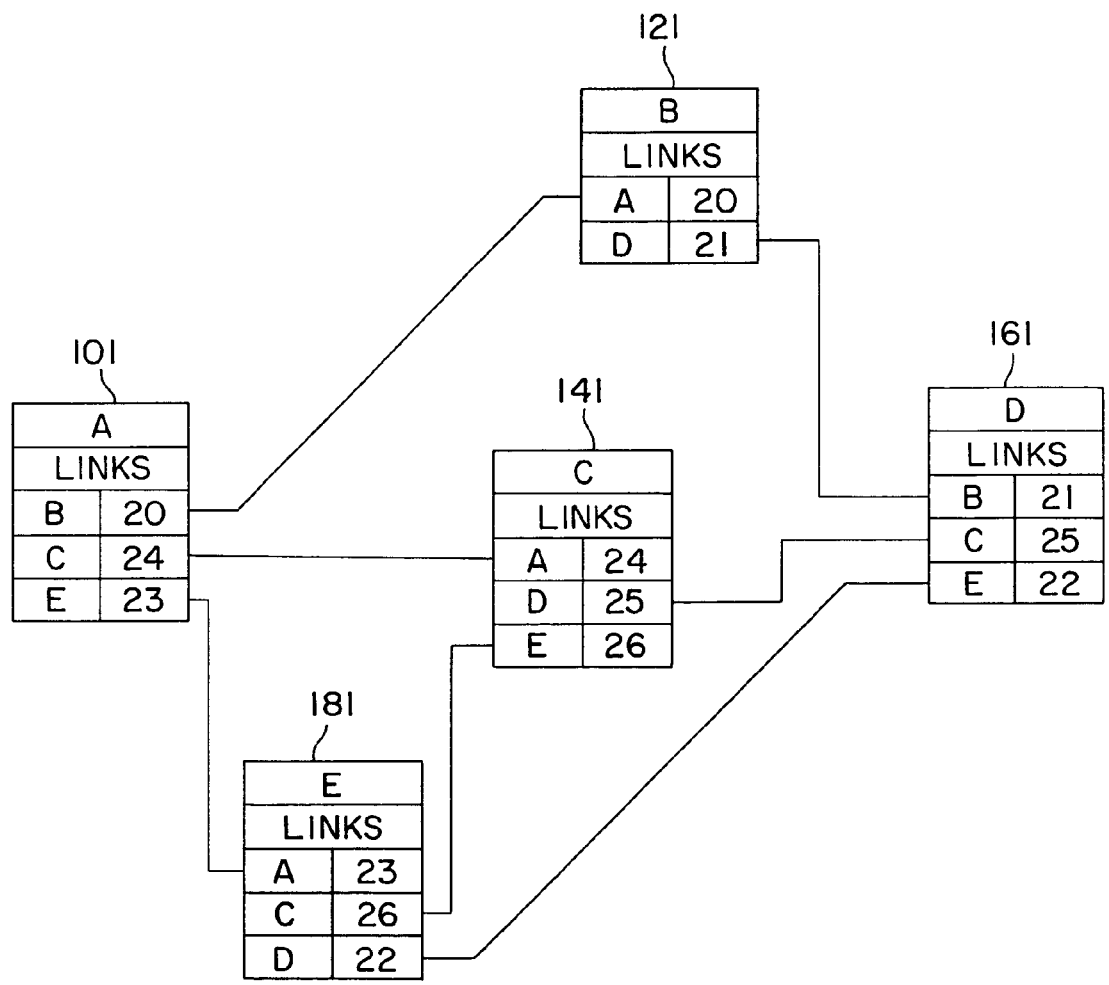
FIG. 3 is a diagram illustrating routing tables for each router in the radio network of FIG. 2.

FIG. 3 is illustrative of the routing tables for each node in the network. Upon collecting the network topology information, each router builds a routing table (stored in memory) containing the acquired data. The routing table includes information such as the identity of the relevant router, a list of the router's operational links, the cost of each operational link, the identity of the node to which the router connects, and other such information.

The routing domain for the network in FIG. 2 is displayed in FIG. 3. The routing tables 101, 121, 141, 161, and 181 correspond to routers 10, 12, 14, 16, and 18, respectively. The routing table 101 for router 10 (radio node A) advertises three active interfaces: one connecting to router 12 (node B) with a cost of 20, one connecting to router 14 (node C) with a cost of 24, and one connecting to router 18 (node E) with a cost of 23.

Numerous other categories of information may be stored in these routing tables. For example, the sequence number, which is used to determine the most up-to-date instance of data in the routing table, can be stored. Additionally, the age of a routing table can be stored so as to indicate when defunct data should be discarded and when the radio node should refresh its router. Another helpful type of data to be stored is the checksum of an advertisement's contents which assists in guarding against data corruption.

Adding more detailed and voluminous data in the routing table can facilitate more sophisticated routing-table calculations which are used for efficient message forwarding in a mobile network.

The topology information is collected by the routing protocols using minimum bandwidth, so that it does not need to be collected again by ROSPF or any type of HELLO messaging.

Figure 4:
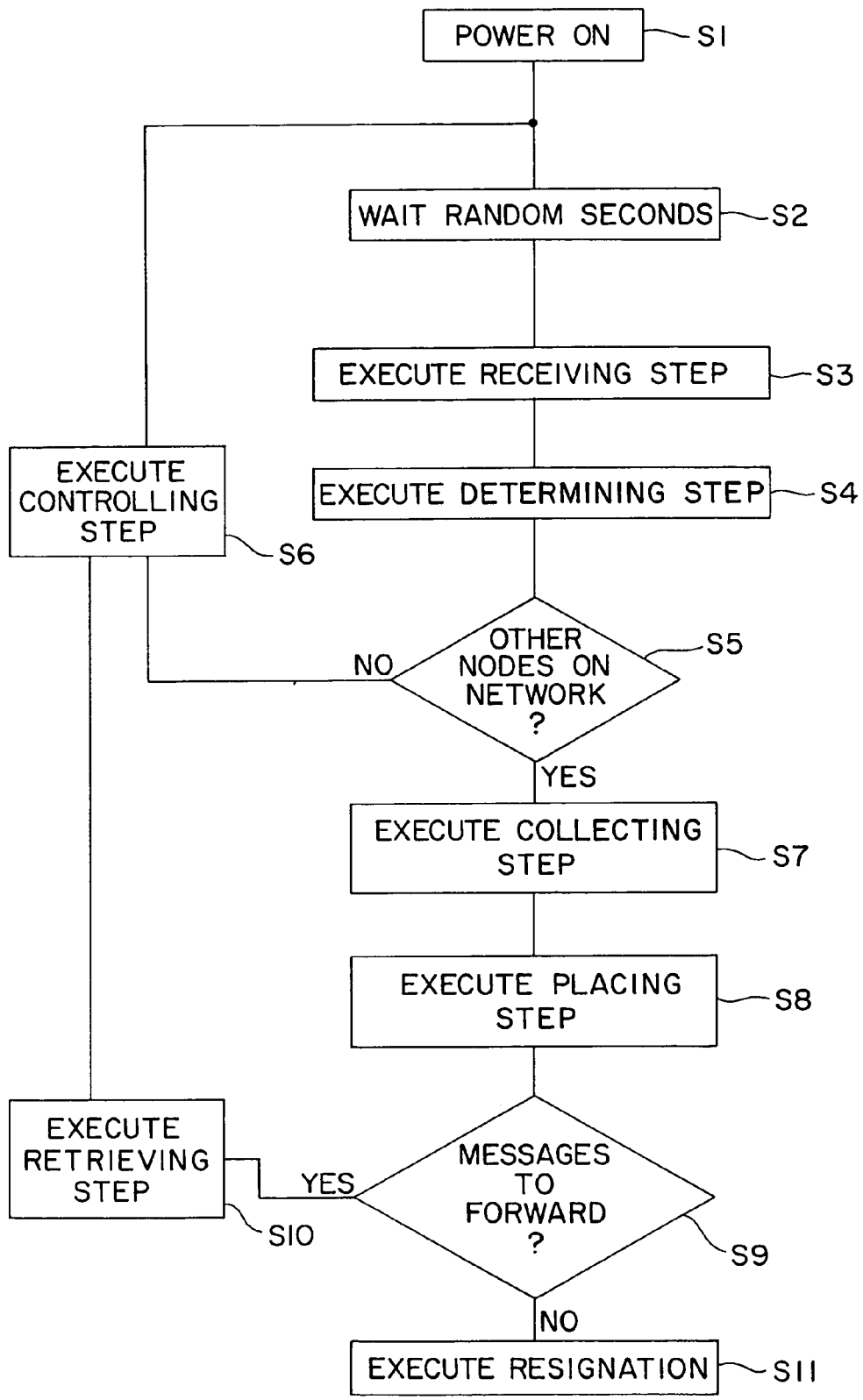
FIG. 4 is a flow chart illustrating the routing method of the present invention.

In the overall method, shown in FIG. 4, each radio node is activated initially by the POWER ON step S1. A delay of random duration, e.g. from 1 to 60 seconds, is provided as indicated in step S2. After the delay, the router executes the receiving step S3 for receiving link state information of the network that has been forwarded to the router.

Subsequently, the determining step S4 is activated and is responsive to the received link state information forwarded to the router for determining connections in the network. If there are other accessible nodes in the network (step S5), then the network connection information is collected by the collecting step S7 and placed in the routing table in the placing step S8.

However, if there are no accessible nodes in the network, then the controlling step S6 is executed. The controlling step S6 determines how often the router will attempt to gather and distribute network topology information. The controller can be programmed so that it controls the frequency of this procedure based on a myriad of factors. For example, the flooding can occur periodically at regular intervals, e.g.

every minute, every 10 minutes, every hour, etc. The controller can also activate this procedure in response to a significant event, such as when a neighboring node leaves or joins a network.

In the case wherein there are other accessible nodes in the network and the data regarding these other nodes has been stored in the routing table, a determination is made in step S9 regarding whether there are messages that need to be forwarded to other nodes in the network. If the response to the inquiry in step S9 is affirmative, then the retrieving step is executed in step S10. Once that is complete, the controlling step is executed in step S6. Based on the frequency with which the controlling step is activating the overall procedure, the process will begin again at the appropriate time.

However, if the response to the inquiry in step S9 is negative, then resignation from the network occurs in step S11.

The ROSPF protocol has a functionality like the OSPF protocol. However, in the ROSPF protocol, the "behavior" of the router has been modified to eliminate enormous quantities of traffic that would otherwise "clog" a large, multi-hop, low bandwidth network, such as a packet radio network. ROSPF allows a large packet radio network to become an internet protocol (IP) backbone. As explained in further detail below, the ROSPF protocol defines a parasitic relationship between two routing protocols.

Figure 5:
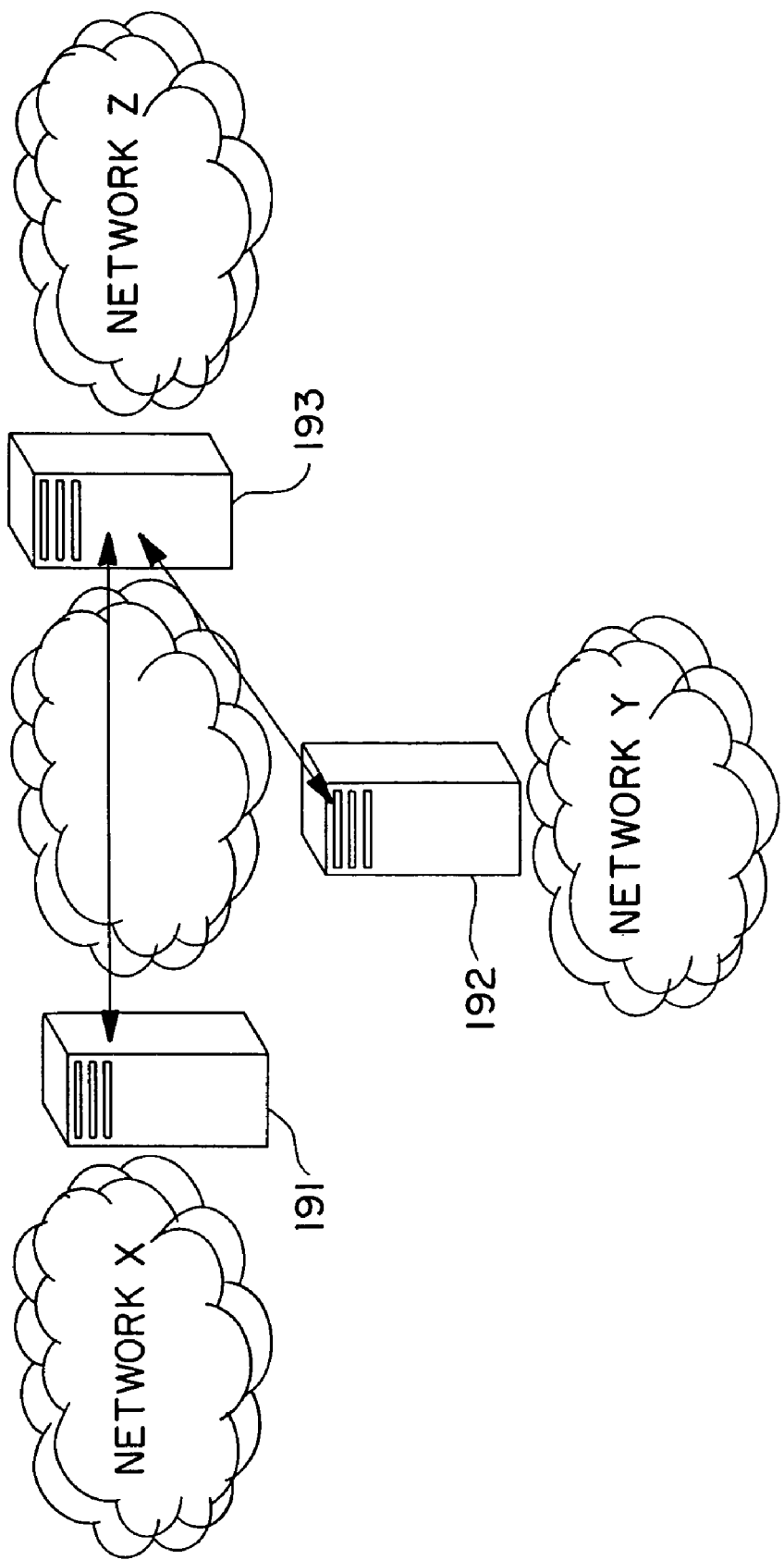
FIG. 5 is a diagram illustrating a "backbone" network of the present invention.

FIG. 5 illustrates a backbone network that is arranged using OSPF. The purpose of OSPF is to compute routes to IP networks. In an initial step of OSPF, each router discovers its neighbors. This is accomplished using the Hello protocol. It not only discovers neighbors but it also elects a "spokesperson" for the network called the designated router.

Secondly, each router constructs Link State Packets (LSPs) that contain the IDs and costs of the links to its neighbors.

Next step, the LSPs are transmitted to all the other neighbors, via the designated router using the link state flooding process. Each router stores the most recently generated LSP from each of the other routers, and creates a link state database. The link state database defines the topology (i.e., the configuration of the nodes and links) of the network and the cost of each link.

Finally, each router uses the link state database to compute routes to each destination.

The network illustrated in FIG. 5 depicts a backbone network created by OSPF. The backbone network provides the means for connecting IP networks X, Y, and Z. Router 193, which is depicted as the designated router, exchanges LSPs with the other two routers. Router 191 and router 192 do not have the capability to exchange LSPs with each other directly.

However it is feasible to use OSPF to create an IP backbone only when the number of OSPF routers that are attached to the backbone network is small in comparison to the bandwidth of the backbone network. Otherwise, in a case when the backbone network is a large-scale packet radio network with limited link bandwidth and a large number of nodes, then the OSPF protocol and LSP traffic will exceed the capacity of the backbone network.

ROSPF uses two primary mechanisms to either reduce or eliminate these traffic loads.

The first mechanism is the elimination of the hello protocol that is an aspect of OSPF. When the backbone network is a packet radio network with an Intranet routing algorithm, and every router in this network is running OSPF, then the Intranet routing algorithm already has information that is equivalent to the information that would be obtained by the OSPF hello protocol. In this particular case, the hello protocol is redundant and can be eliminated. However, this redundancy would not exist if the backbone network consists of, for example, an Ethernet LAN or an X.25 network. Accordingly, ROSPF can primarily be used in conjunction with a network that has an Intranet routing algorithm. The Intranet is an independent entity that provides information to the OSPF protocol, while ROSPF defines the parasitic relationship between the Intranet and the OSPF protocols.

Figure 6A:
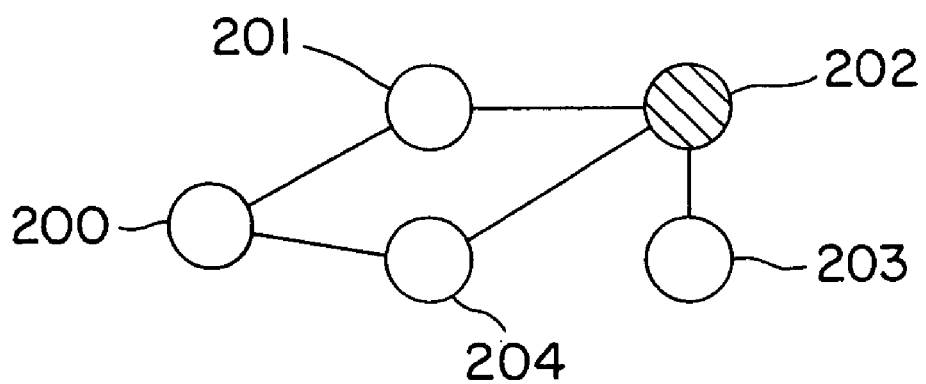
FIGS. 6A and 6B are diagrams of a packet radio network with and without a designated router.
Figure 6B:
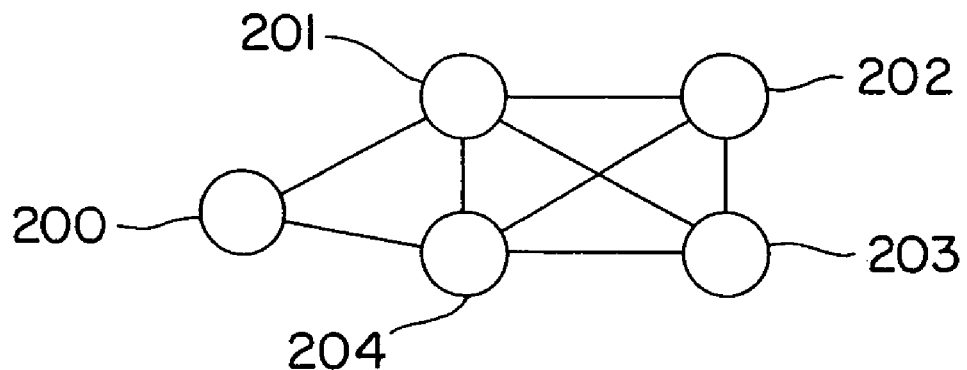

The second mechanism employed by ROSPF is the elimination of designated routers. Designated routers define the way that link state packets are flooded. They flow from a given router to the designated router and then fan out to reach all the other routers. In a large scale network, the flow of link state packets through the designated router can make it a "hot spot" as illustrated in FIG. 6A, wherein designated router 202 denotes the hot spot of the network. In a packet radio network with an Intranet routing algorithm, the backbone network topology includes a connected graph, as shown in FIG. 6A. The Intranet forwarding tables define the routes that packets take through the network.

However, in ROSPF there is no designated router and IP LSPs are exchanged by each node with its Intranet neighbors. In essence, IP link state packets flow through the network like a rumor in a community, or a ripple in a pond. As such, ROSPF eliminates the designated router hot spot.

The ROSPF/Intranet interface enables the Intranet to provide ROSPF with two lists: the next-hop list and the census list. The next-hop list is used to define OSPF adjacencies (i.e., one-hop radio neighbors). The census list is used identify all radio routers on the network. Deltas (differences in these lists) are used to quickly detect deceased routers.

Figure 7:
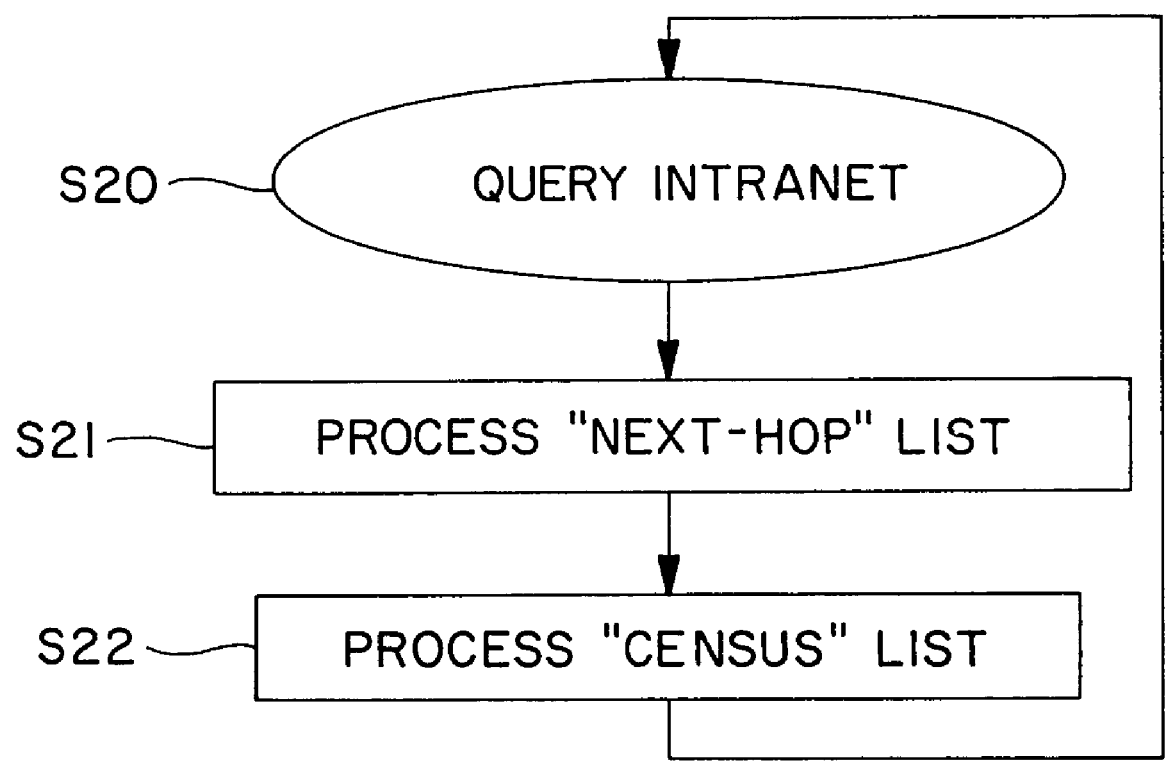
FIG. 7 is a flow chart of the ROSPF processing method.

The ROSPF processing method is illustrated in FIG. 7. In step S20, ROSPF queries the Intranet. The next-hop list is processed in step S21. In this step the network is examined for deltas to build OSPF adjacencies with new neighbors and terminate OSPF adjacencies with missing neighbors.

The census list is processed in step S22. The census list defines all of the nodes that are currently in the network. The deltas are computed by comparing the new list with the old list. ROSPF ignores the new nodes, but identifies the nodes that have "dropped off" the list. For each node that is no longer on the list, ROSPF marks the IP link-state that the node advertised as irrelevant and computes an updated IP forwarding table. Census list processing allows ROSPF to quickly detect "dead" routers.

The ROSPF process is cyclical and begins again at step S20. The frequency of the Intranet queries can be periodic, predetermined, or set by any number of variables.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

For example, the radio network has been described as having five radio communication nodes (FIGS. 2 and 3). However, the network can include any number of radio and wired links. Also, as will be appreciated by those skilled in the art, the methods and control logic, as described herein, can be embodied in a programmable computer or computer executable software that is stored on computer readable media, for example, on a floppy disk, RAM, ROM, a hard disk, removable medium, flash memory, memory sticks, optical medium, magneto-optical mediums, etc.

Additionally, the described methods, structure, and functions are directed to wireless mobile communications stations that automatically configure themselves in a mobile communications network, with each mobile station directing its respective affiliation. However, control of such configurations could be centralized to cluster heads, for example, which would then direct affiliation on a network level to optimize the network. Furthermore, the above methods and structure are not limited to wireless communications networks, but may be employed by any system wherein there is an Intranet protocol to interface with the ROSPF protocol.

What is claimed is:

1. A method of distributing routing information comprising:
   processing lower layer protocol topology information received at a router on a first subnetwork, the topology information including a set of nodes on the first subnetwork and a subset of the nodes that are lower layer protocol next-hop neighbors to the router; and
   forming higher layer protocol adjacencies with the subset of nodes based on the processed lower layer topology information for the flooding of higher layer routing information among the set of nodes on the subnetwork;
   receiving updated lower layer protocol topology information;
   processing the updated lower layer protocol topology information; and
   changing the higher layer protocol adjacencies based on the processed updated lower layer protocol topology information.

2. The method of claim 1 further comprising:
   generating, for the higher layer protocol, routing information describing the set of nodes on the subnetwork based upon the processed lower-layer topology information; and
   advertising, using the higher layer protocol, the generated routing information to at least one node located on a second subnetwork; generating, for the higher layer protocol, updated routing information based on the processed updated lower layer protocol topology information; and
   advertising using the higher layer protocol, the generated updated routing information to at least one node located on the second subnetwork.

3. The method of claim 2 wherein the higher layer protocol is compatible with OSPF at the second subnetwork.

4. The method of claim 1 wherein the higher layer protocol is an Internet routing Protocol.

5. The method of claim 1 wherein the higher layer protocol includes the topology information used by OSPF.

6. The method of claim 1 wherein the first subnetwork is a radio network.

7. The method of claim 1 wherein nodes of the first subnetwork are in communication with each other using a first transmission medium, the first subnetwork is in communication with a second subnetwork using a second transmission medium, and wherein the first transmission medium has a lower bandwidth than the second transmission medium.

8. The method of claim 1, wherein the nodes on the first subnetwork are mobile.

9. A system for distributing routing information comprising:
   a plurality of nodes in communication with one another via a first transmission medium forming a first subnetwork;
   a lower layer protocol for generating lower layer protocol topology information at a router within the first subnetwork including a set of nodes on the first subnetwork and a subset of the nodes that are lower layer protocol next-hop neighbors to the router; and
   a processor for processing the lower layer protocol topology information to provide the topology information to a higher layer protocol, wherein the higher layer protocol forms higher layer protocol adjacencies with the nodes in the subset based on the processed lower layer topology information for the flooding of higher layer routing information among the set of nodes on the subnetwork.

10. The system of claim 9 wherein the processor further generates, for the higher layer protocol, routing information describing the set of nodes on the subnetwork based upon the processed lower-layer topology information, the system further comprising:
    a second transmission medium connecting the first subnetwork to a second subnetwork; and
    an advertiser for advertising, using the higher layer protocol, the generated routing information to at least one node located on the second subnetwork.

11. The system of claim 10 wherein the first transmission medium has a lower bandwidth than the second transmission medium.

12. The system of claim 10 wherein the higher layer protocol is compatible with OSPF at the second subnetwork.

13. The system of claim 9 wherein the higher layer protocol includes the topology information used by OSPF.

14. The system of claim 9 wherein the first subnetwork is a radio network.

15. The system of claim 9 wherein the first subnetwork is in communication with a second subnetwork using a second transmission medium, and wherein the first transmission medium has a lower bandwidth than the second transmission medium.

16. The system of claim 9 wherein the nodes on the first subnetwork are mobile.

17. A router comprising:
    a lower layer protocol module for processing lower layer protocol topology information received at the router corresponding to a first subnetwork on which the router resides, the topology information including a set of nodes on the first subnetwork and a subset of the nodes that are lower-layer protocol next-hop neighbors to the router; and
    a higher layer protocol module for forming higher layer protocol adjacencies with the subset of nodes based on the processed lower-layer topology information for the flooding of higher layer routing information among the nodes on the first subnetwork.

18. The router of claim 17 wherein the higher layer protocol module further generates, for the higher layer protocol, routing information describing the set of nodes on the first subnetwork based upon the processed lower-layer topology information, and advertises, using the higher layer protocol, the generated routing information to at least one node located on a second subnetwork.

19. The router of claim 18 wherein the higher layer protocol is compatible with OSPF at the second subnetwork.

20. The router of claim 18 wherein the first transmission medium has a lower bandwidth than the second transmission medium.

21. The router of claim 17 wherein the higher layer protocol is an Internet routing Protocol.

22. The router of claim 17 wherein the higher layer protocol includes the topology information used by OSPF.

23. The router of claim 17 wherein the first subnetwork is a radio network.

24. The router of claim 17 wherein nodes of the first subnetwork are in communication with each other using a first transmission medium, the first subnetwork is in communication with a second subnetwork using a second transmission medium, and wherein the first transmission medium has a lower bandwidth than the second transmission medium.

25. The router of claim 17 wherein the nodes on the first subnetwork are mobile.

26. Computer executable software code stored in a computer readable medium, which upon execution carries out a method of distributing routing information comprising:
   processing lower layer protocol topology information received at a router on a first subnetwork, the topology information including a set of nodes on the first subnetwork and a subset of the nodes that are lower layer protocol next-hop neighbors to the router; and
   forming higher layer protocol adjacencies with the subset of nodes based on the processed lower layer topology information for the flooding of higher layer routing information among the nodes on the subnetwork;
   receiving updated lower layer protocol topology information;
   processing the updated lower layer protocol topology information; and
   changing the higher layer protocol adjacencies based on the processed updated lower layer protocol topology information.

27. The computer executable software code of claim 26 which upon execution, the method further comprises:
   generating, for the higher layer protocol, routing information describing the set of nodes on the subnetwork based upon the processed topology information; and
   advertising, using the higher layer protocol, the generated routing information, to at least one node located on a second subnetwork;
   generating, for the higher layer protocol, updated routing information based on the processed updated lower layer protocol topology information; and
   advertising using the higher layer protocol, the generated updated routing information to at least one node located on the second subnetwork.

28. The computer executable software code of claim 27 wherein the higher layer protocol is compatible with OSPF at the second subnetwork.

29. The computer executable software code of claim 27 wherein nodes of the first subnetwork are in communication with each other using a first transmission medium, the first subnetwork is in communication with the second subnetwork using a second transmission medium, and wherein the first transmission medium has a lower bandwidth than the second transmission medium.

30. The computer executable software code of claim 29 wherein the nodes on the first subnetwork are mobile.

31. The computer executable software code of claim 26 wherein the higher layer protocol is an Internet routing protocol.

32. The computer executable software code of claim 26 wherein the higher layer protocol includes the topology information used by OSPF.

33. The computer executable software code of claim 26 wherein the first subnetwork is a radio network.

34. The computer executable software code of claim 26 wherein nodes of the first subnetwork are in communication with each other using a first transmission medium, the first subnetwork is in communication with a second subnetwork using a second transmission medium, and wherein the first transmission medium has a lower bandwidth than the second transmission medium.

* * * * *